(12) United States Patent
Isaac et al.

(10) Patent No.: US 7,862,413 B2
(45) Date of Patent: Jan. 4, 2011

(54) REMOTELY POSITIONABLE INTERRUPTION PLATE

(75) Inventors: Nathan E. Isaac, Lancaster, PA (US); Jason M. Benes, Mt. Joy, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/612,782

(22) Filed: Nov. 5, 2009

(65) Prior Publication Data

US 2010/0291982 A1    Nov. 18, 2010

Related U.S. Application Data

(60) Provisional application No. 61/216,525, filed on May 18, 2009.

(51) Int. Cl.
*A01F 12/40* (2006.01)

(52) U.S. Cl. .................................................. 460/112
(58) Field of Classification Search ................. 460/112, 460/111, 901; 241/243, 224, 195, 191, 332, 241/101.76; 239/650, 681, 666, 682
See application file for complete search history.

(56) References Cited

U.S. PATENT DOCUMENTS

| | | | |
|---|---|---|---|
| 2,626,159 A * | 1/1953 | Thompson | 239/689 |
| 2,920,433 A | 1/1960 | Brady | |
| 3,005,637 A | 10/1961 | Hetteen | |
| 4,612,941 A | 9/1986 | Kunde | |
| 6,354,938 B1 * | 3/2002 | Schrattenecker | 460/112 |
| 6,554,701 B1 * | 4/2003 | Wolters | 460/101 |
| 7,156,732 B2 | 1/2007 | Kühn et al. | |
| 2007/0004479 A1 | 1/2007 | Dow et al. | |
| 2008/0293462 A1 | 11/2008 | Farley et al. | |

FOREIGN PATENT DOCUMENTS

| | | |
|---|---|---|
| EP | 0415419 A2 | 3/1991 |
| FR | 2569520 A1 | 3/1986 |
| JP | 408000060 A | 1/1996 |
| JP | 2002171824 A | 6/2002 |

\* cited by examiner

*Primary Examiner*—Árpád Fábián-Kovács
(74) *Attorney, Agent, or Firm*—Michael G. Harms; Patrick M. Sheldrake

(57) ABSTRACT

A remotely positionable interruption plate system for altering chop quality in a chopper assembly. The system includes a base and an interruption plate slidably mounted to the base. The interruption plate is arranged and disposed to selectively position the interruption plate into at least a portion of a residue flow of the chopper assembly. The selective positioning of the interruption plate is accomplished remotely. An agricultural vehicle and a method utilizing the remotely positionable interruption plate system are also disclosed.

18 Claims, 9 Drawing Sheets

REMOTELY POSITIONABLE INTERRUPTION PLATE

CROSS-REFERENCE TO RELATED APPLICATIONS

This application claims the benefit of U.S. Provisional Application No. 61/216,525, filed May 18, 2009.

FIELD OF THE INVENTION

The present invention is generally directed to agricultural harvesting combines and machines and to straw and residue chopping systems therewith, and more particularly to improvements in the chopper assembly. In particular, the present invention is directed to interruption plate insertion mechanisms through the concave pan portion of the chopper assembly.

BACKGROUND OF THE INVENTION

In the operation of a typical agricultural combine that employs a threshing rotor, the flow of crop residue, sometimes referred to as material other than grain (MOG), remaining after threshing is typically discharged into a crop residue treatment and distribution system for treatment thereby and for ultimate distribution onto or over a field. Straw and residue chopper assemblies and residue spreader assemblies of various types and constructions have long been in use in or with such residue treatment and distribution systems. Such assemblies have operated to chop or pulverize the crop residue resulting from a harvesting operation into finer pieces and/or to spread the resulting crop residue, whether chopped into finer pieces by operation of a chopper assembly or passed through the spreader assembly as larger pieces of residue, onto and over the field. While such chopper and residue spreader assemblies have taken various forms, depending upon the desires of users and manufacturers, they may sometimes be identified as being of certain general types.

Many typical harvesters have traditionally employed technology and methods that have become associated with what is sometimes referred to as a hood mount chopper. Generally, such hood mount choppers can be described as flail choppers, and the systems of which they are a part have evolved to the point that they may include over 100 flail knives on a rotating chopper, mounted within a dedicated housing that provides an appropriate environment for the operation of the rotating chopper so as to best maximize its performance. The rotating chopper of such a residue management system may often operate at or above 3000 RPM and provide suitable and sufficient energy to the chopped material to be able to effect a spread of the chopped material over a width of up to 40 feet, which width generally corresponds to the cut width of the header. Such a residue management system is thus operable for its intended purpose of chopping and spreading the chopped material over a field, and generally operates effectively in such regard. With such a system, if a user does not desire to chop the straw, he may turn the chopper off and bypass, or route the material flow around, the chopper.

Typical Case IH harvesters, however, have, for more than 25 years now, in an effort to provide greater equipment versatility while reducing equipment complexities, typically employed a somewhat different technology in the residue management systems thereof. Such alternative technology, the primary purpose of which has been the transport of material away from the threshing system, has utilized a multifaceted construction that affords greater versatility in the transport of such material in that such material can not only be transported, but can also be treated in varying manners dependent upon the desires of operators. Such constructions have come to be known as integral choppers or integral chopper or chopping systems due to the integration of a chopping function, in addition to the primary transport function, into the combine and its operations. Such integral chopper systems, because of their positioning within the combine and their functional capabilities, offer a versatility not generally available with the hood mounted chopper systems.

Such integral chopper systems have been so designed that, as noted hereinabove, their primary function is the transport of material away from the threshing system and a secondary function is the treatment of such material as it is being so transported. Such operations are usually effected in one of two different ways. Most commonly, the integral chopper system is operated to transport the material from the threshing system to a spreading system as a rotary chopper element or portion rotates at or near 3000 RPM so as to quickly move the material rearward and to also chop it into smaller pieces as it is being so transported. Less commonly, the integral chopper system is operated to more gently transport the material from the threshing system to a spreading system as the rotary chopper element operates at a much slower speed, typically at only about 800 RPM, with considerably less chopping activity. In the former instance, the desire and expectation is that the material will be transported and that the shortest mean length of cut will be realized to allow for modern minimum tillage applications while the chopping is accomplished using as little power as possible. In the latter instance, the desire and expectation is that the material will be transported in such a manner as to provide the longest and least damaged straw possible.

Thus, in the operation of a typical combine that employs an integral chopper system, the flow of crop residue after threshing is typically discharged into a crop residue treatment and distribution system located below and rearward of the rear end of the threshing system, which crop residue treatment and distribution system includes the integral chopper system and its primary rotary chopper or beater apparatus or assembly that is operable to chop or beat the residue into smaller pieces as it transports and/or propels the resultant crop residue further rearward within a rear end of the combine for either discharge from the combine through a rear opening onto a field, or into another secondary chopper and/or spreader mounted on the rear end operable for spreading the residue over a swath of a field.

During a typical operation of such a combine, as the crop residue is discharged from the combine rotor and moves through the crop residue treatment and distribution system, it flows between the rotary chopper element of the integral chopper assembly and the chopper grate assembly thereof. When the stationary knife assembly is in an engaged position, as the crop residue is being moved and propelled rearward, such crop residue is also chopped into smaller pieces by the cooperative actions of the knife blades or elements of the stationary knife assembly and the knife blades or paddles on the rotating rotary chopper element. The rotational movement of the rotary chopper element, typically at or near 3000 RPM, thus serves not only to propel the resultant flow of crop residue further rearward, but also to effect a cutting of the material encountered by the knife blades or paddles associated therewith.

Also, some users have expressed beliefs that the chop quality realizable by integral chopper systems, at least in length of cut (LOC), has remained inferior to the chop quality that could be realized by hood mounted choppers.

Consequently, attempts to develop improved chopping systems have continued. The ongoing challenge has been to develop chopping assembly that can offer the various advantages desired while overcoming or minimizing the disadvantages that have been encountered with the prior art systems. What is needed is a system for remote positioning of an interruption plate into the residue flow area of a chopper assembly to control the LOC and chop quality desired by the user.

SUMMARY OF THE INVENTION

What has now been developed and is disclosed herein is an improved chopper assembly that incorporates into its design various features and components that contribute to an overall improvement in and versatility of operation. Among such features is integral chopper system having a remotely positionable interruption plate that provides control of the length of cut and chop quality.

One embodiment of the present disclosure includes a remotely positionable interruption plate system for altering chop quality in a chopper assembly. The system includes a base and an interruption plate slidably mounted to the base. The interruption plate is arranged and disposed to selectively position the interruption plate into at least a portion of a residue flow of the chopper assembly. The selective positioning of the interruption plate is accomplished remotely.

Another embodiment of the present disclosure includes an agricultural vehicle having a chopper assembly. The chopper assembly includes a remotely positionable interruption plate system for altering chop quality in a chopper assembly having a base and an interruption plate slidably mounted to the base. The interruption plate is arranged and disposed to selectively position the interruption plate into at least a portion of a residue flow of the chopper assembly. The selective positioning of the interruption plate is accomplished remotely.

Still another embodiment of the disclosure includes a method of chopping residue formed during harvesting. The method includes providing a chopper assembly including a remotely positionable interruption plate system. The interruption plate system includes a base and an interruption plate slidably mounted to the base. The interruption plate is arranged and disposed to selectively position the interruption plate into at least a portion of a residue flow of the chopper assembly. The selective positioning of the interruption plate is accomplished remotely. The method further includes chopping the residue and modifying the length of cut of the residue by remotely positioning the interruption plate with the interruption plate system.

An advantage of embodiments of the present disclosure includes the ability to accurately control the LOC and quality of chop.

Another advantage of embodiments of the present disclosure is the ability to position the interruption plate without the need for tools or opening the equipment.

Another advantage of embodiments of the present disclosure is the ability to retrofit or utilize existing chopping system designs to provide greater control of LOC and quality of chop.

Such features, by themselves and in conjunction with various other improvements and features of the integral chopper assembly, including improvements in and features of the remotely insertable and/or positionable interruption plate, contribute to the improved performance realizable with the preferred integral chopper assembly that is further described and discussed in greater detail hereinafter.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

The accompanying drawings, which are incorporated in and constitute a part of this specification, illustrate the preferred embodiment of the invention, and together with the description, serve to explain the principles of the invention.

DETAILED DESCRIPTION OF THE INVENTION

Figure 1:
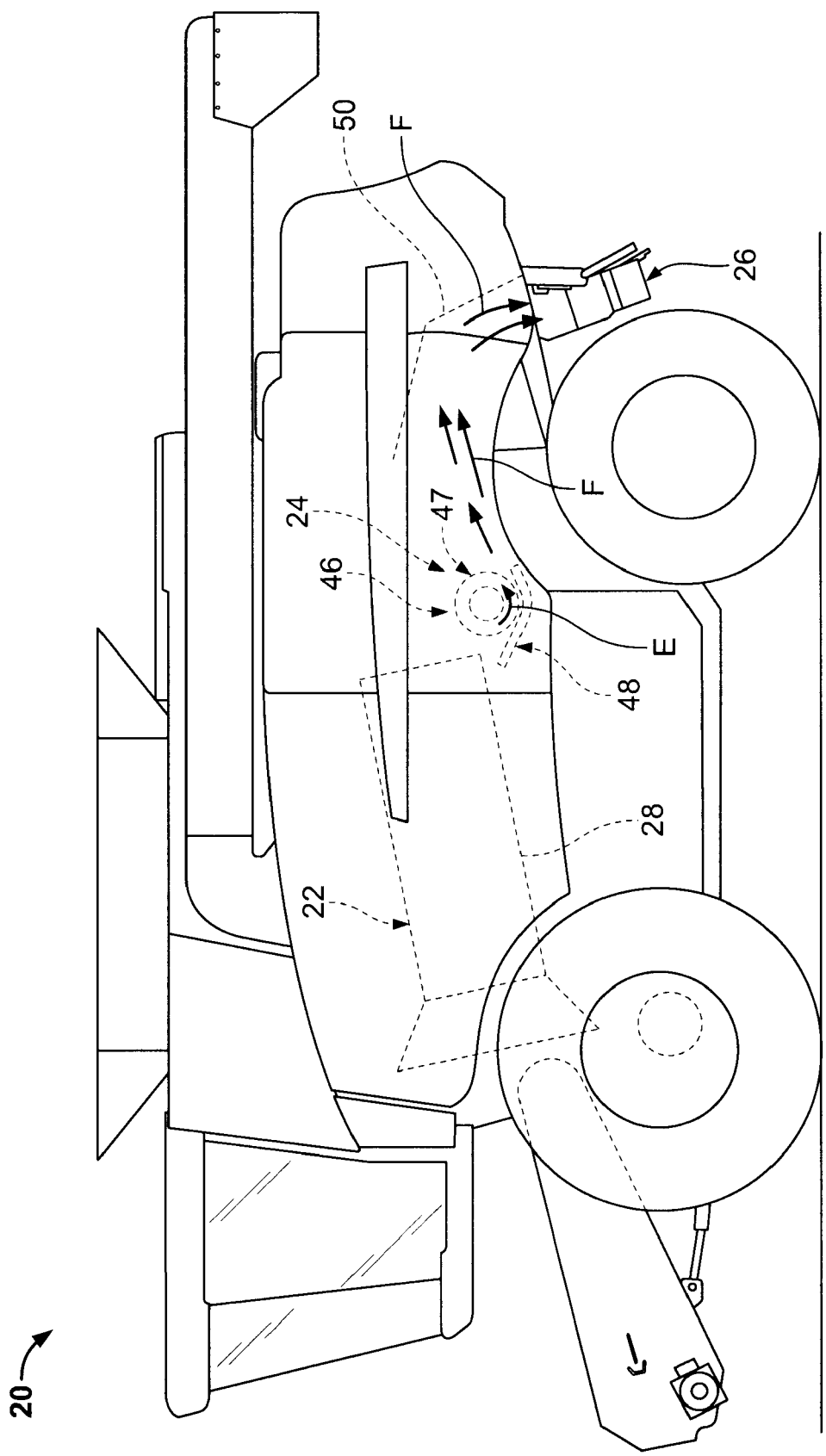
FIG. 1 is a simplified side view, from the left side, of an agricultural combine, illustrating, in dotted outline, an axially arranged threshing system of the combine and an improved integral chopper assembly of the residue treatment and distribution system of the combine that includes the present invention.

Reference will now be made in detail to the present preferred embodiment of the control circuit of the invention, examples of which are illustrated in the accompanying drawings. Wherever possible, the same reference characters will be used throughout the drawings to refer to the same or like parts.

Figure 2:
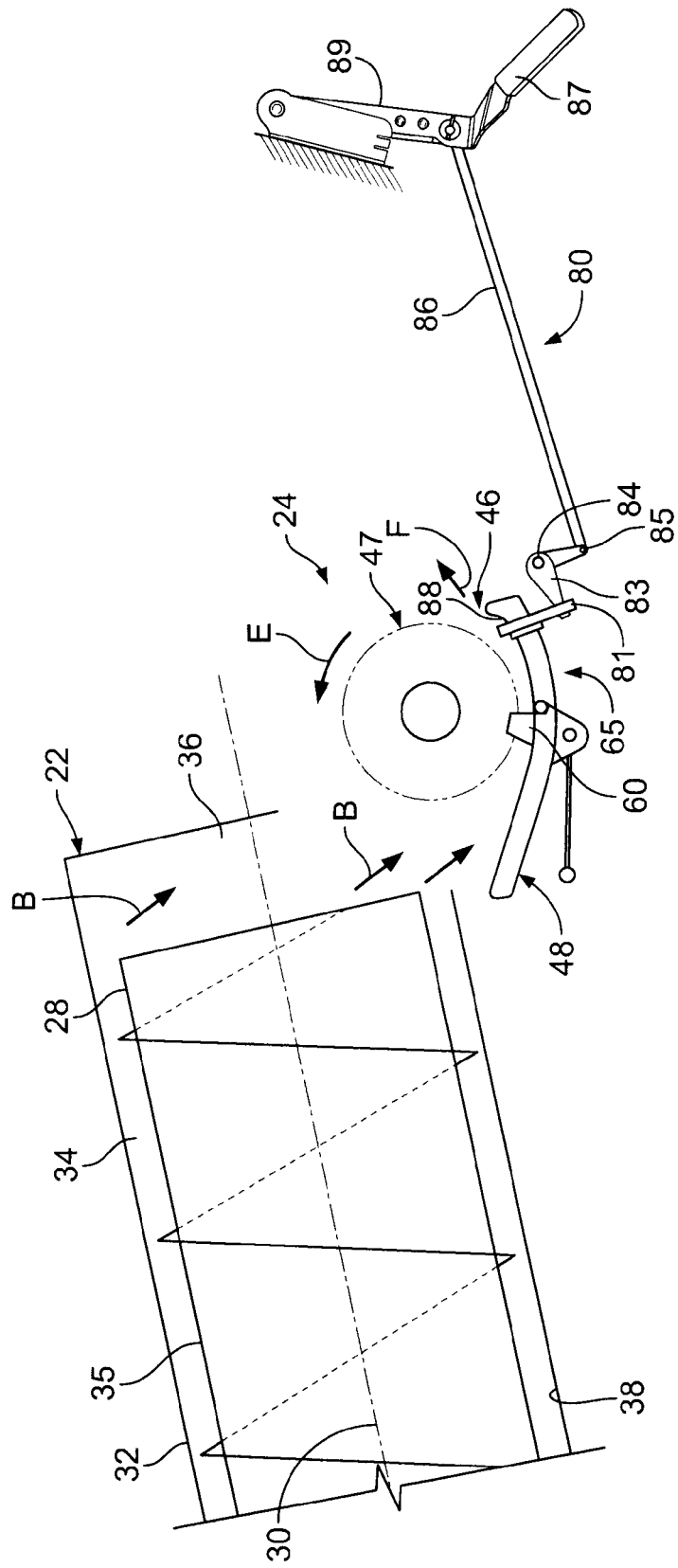
FIG. 2 is a simplified enlarged, partial side view, from the left side, of the threshing system and a portion of the crop residue treatment and distribution system of the combine of FIG. 1, further illustrating the flow of crop residue to and through the integral chopper assembly.

Referring now to the drawings, wherein preferred embodiments of an improved integral chopper assembly including the present invention are shown, wherein like numerals refer to like items, wherein certain elements and features may be labeled or marked on a representative basis without each like element or feature necessarily being individually shown, labeled, or marked, and wherein certain elements are labeled and marked in only some, but not all, of the drawing figures, FIGS. 1 and 2 depict a representative agricultural combine 20 that includes a longitudinally axially arranged threshing system 22 and a crop residue treatment and distribution system 24 with a crop residue spreader 26, all of which, except for the improved integral chopper system that is the subject hereof and which is included within the crop residue and distribution system 24, are of well known construction and operation.

As can be generally and essentially observed from a review and study of FIGS. 1-2, threshing system 22 is axially arranged in that it includes a cylindrical threshing rotor 28 conventionally supported and rotatable in a predetermined, typically clockwise direction, about a rotational axis 30 therethrough and within a concave drum 32 (FIG. 2), for conveying a flow of crop material in a helical flow path through a space 34 extending circumferentially around an outer cylindrical surface 35 of rotor 28 and an inner circumferential surface 38 of concave drum 32. As the crop material is moved through space 34, the crop, such as grain, legumes, or the like, will be loosened and separated from crop residue such as husk and pods, and carried away therefrom in the well known conventional manner.

As may be best illustrated by FIG. 2, the crop residue will continue along a helical path through space 34, and will be expelled therefrom, as denoted by arrows B, into and through a discharge opening and passage 36, which essentially comprises an extension of space 34 at the downstream end of threshing rotor 28. The consistency of the flow of crop residue, volume thereof, and extent or pattern thereof, will typically vary, and be a function of a variety of conditions, including, but not limited to, the speed of rotation of rotor 28, crop type, plant maturity, moisture content, and weather conditions. As an example, rotor speeds can vary between just a few hundred RPM and more than 1000 RPM. Wheat and other small grains will typically have relatively small crop residue components; whereas other grains, such as corn, will typically have larger components, such as thick stalk segments, cob fragments, and large leaves.

Crop residue treatment and distribution system 24 will typically include a transport and chopping assembly, such as integral chopper assembly 46, sometimes hereinafter referred to as rotary assembly 46 having a rotary chopper element 47 rotatable in a direction E above a concave pan assembly such as chopper grate assembly 48. Rotary chopper element 47 typically rotates at a rapid speed, so as to be capable of accelerating and propelling a flow of crop residue rearward within the confines of the rear end of combine 20, as generally denoted by arrows F. Such rearward flow is typically guided and directed by internal panels or shields, generally denoted by shields 50 (FIG. 1), so as to either flow through a rear opening so as to be deposited directly onto a field, such as in a windrow, or flow into a secondary crop residue chopper and/or spreader, such as chopper/spreader 26, for spreading thereby in a swath on the field.

Much of the discussion that now follows, particularly regarding FIGS. 2-10, describes noteworthy features and components of the system that has been developed, and the operation thereof. Inasmuch as the preferred assembly, including the remotely positionable interruption plate 81, that is so discussed is currently considered to include the best mode of the subject invention to effect the advantages sought therefore, such discussion is considered instructive and helpful to an understanding and appreciation of the manner in which the invention that is the subject of this application, which will thereafter be described and discussed in greater detail, functions and operations within the preferred integral chopper system. Consequently, the following discussion, except when it actually turns to and is directly addressing the subject invention, is not intended to, and should not be considered to, set forth requirements for or limitations to any features or components that are or may be advantageously employed with the subject invention in integral chopper systems, but should instead be considered as background information and/or as information that enhances an understanding of the subject invention and its operation.

Figure 3:
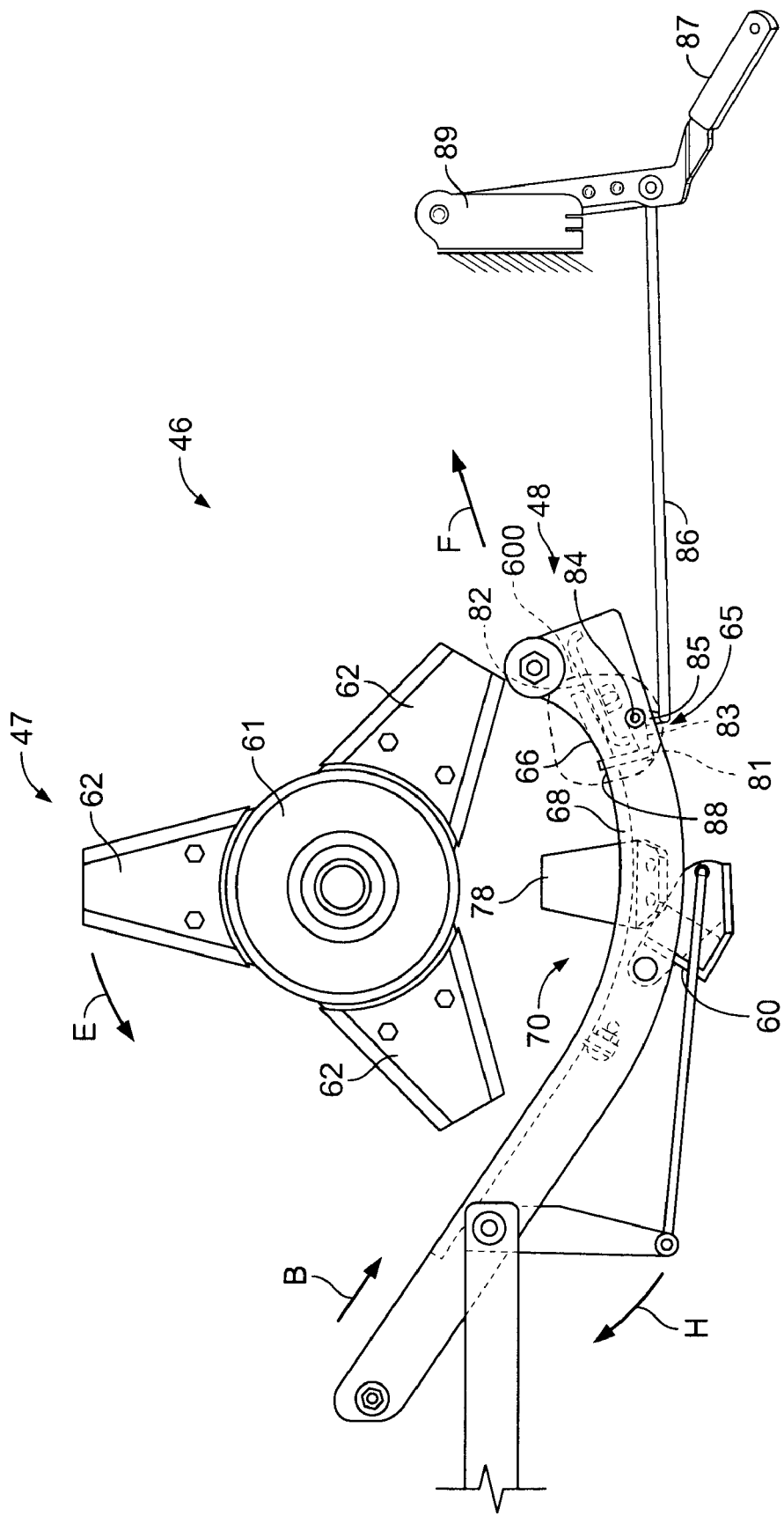
FIG. 3 is a simplified enlarged, partial side view, generally of a portion of the integral chopper assembly, including the remotely positionable interruption plate of the present invention.
Figure 4:
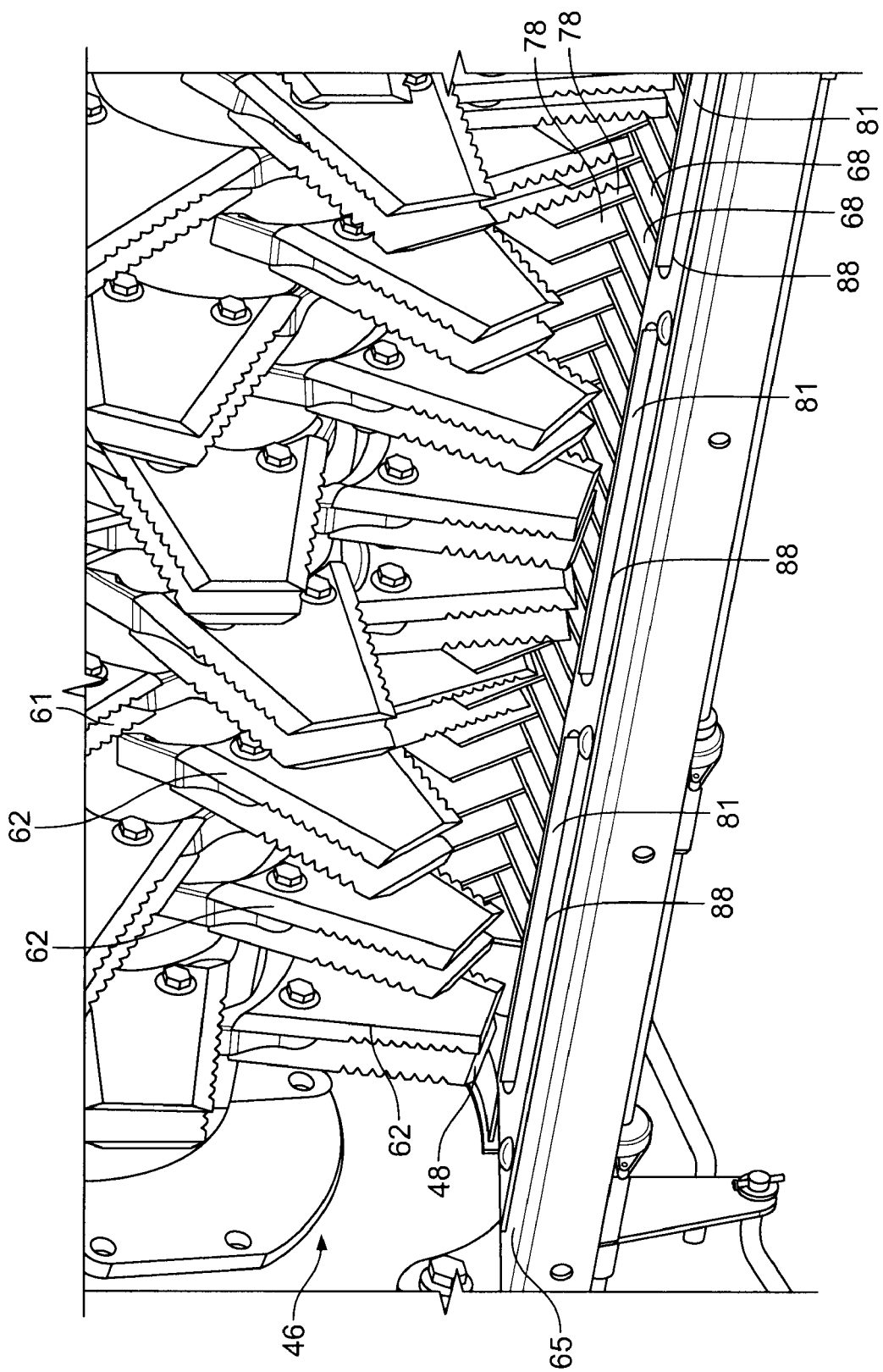
FIG. 4 is an enlarged, partial perspective view of a portion of the chopper grate assembly, including a remotely positionable interruption plate according to one embodiment of the present invention.
Figure 5:
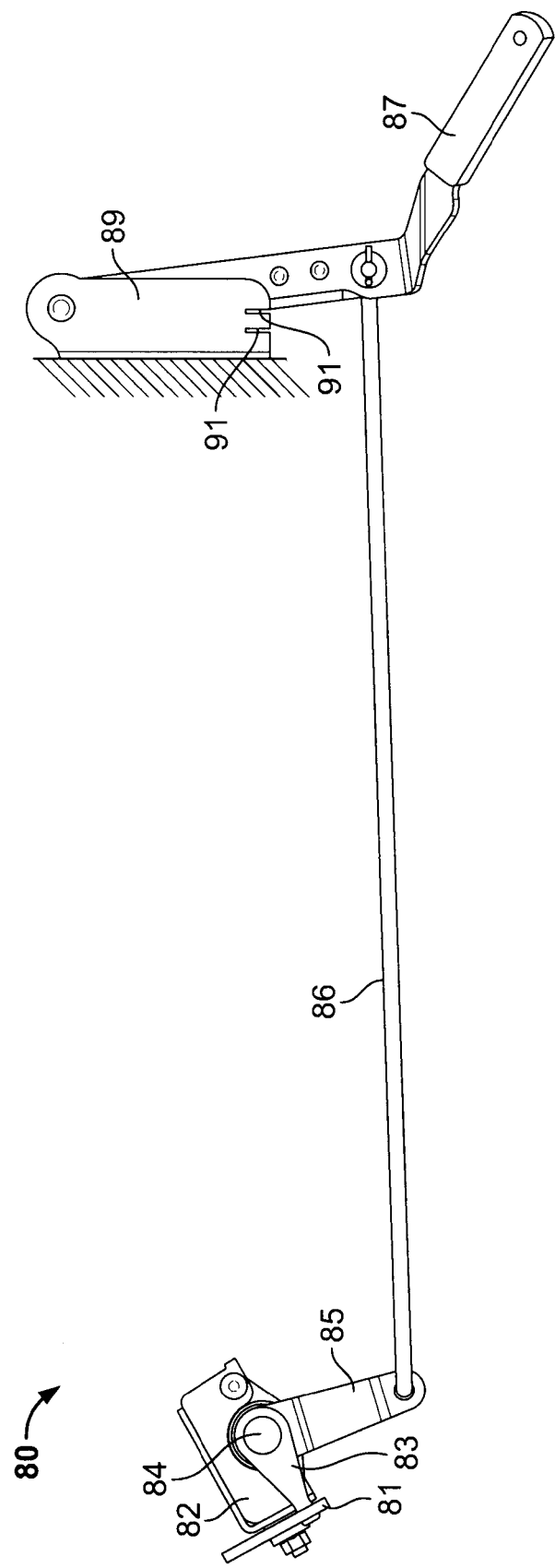
FIG. 5 is a side view of an interruption plate assembly according to an embodiment.

In light of the foregoing, FIGS. 3-4 thus depict generally a portion of an integral chopper assembly 46 that includes not only a concave pan portion 65 that employs an interruption plate 81 downstream from the slots 68 of the chopper grate assembly 48, but also various other features of note, including, as one feature, a rotary chopper portion or element 47 that extends generally horizontally across the flow path of the crop residue above the chopper grate assembly 48, which chopper grate assembly 48 includes as a portion thereof the counter knife assembly 60. Such rotary chopper element 47 includes a cylindrical element or like rotary member 61, and has a number of paddles or knife blades 62, only representative ring sets of which are individually depicted in FIGS. 3 and 4, mounted or affixed thereto at a plurality of mounting locations distributed about its periphery. The particular positionings, arrangements, and configurations of such plurality of paddles or knife blades 62 may vary and can be any known arrangement of paddles or knife blades.

As may now be better observed from FIG. 3, rotary chopper element 47 and grate portion 66 of concave pan portion 65 of chopper grate assembly 48 define a passageway 70 therebetween for the crop residue flow that is directed to the integral chopper assembly 46 for treatment thereby, such as crop residue flow B from the threshing system 22 (FIG. 2). The slots 68 in grate portion 66 are generally elongated and extend along such grate portion 66 generally in the direction of the crop residue flow B.

In light of the foregoing discussion, it should be apparent that, with the constructions described and discussed hereinabove, the preferred integral chopper assembly 46 is operable to transport the crop residue, including foreign objects therein, rearward within the combine 20 and to also chop the residue, especially when the rotary member 61 is operating near 3000 RPM and the counter knife assembly 60 is positioned with its blade elements 78 extended through slots 68 in grate portion 66 to project into the pathway 70 between the rotary element 47 and the chopper grate assembly 48. As such transport and chopping occurs, the residue is flowing along the upper surface of concave pan portion 65. By providing as part of the concave pan portion 65 a remotely positionable interruption plate 81 that extends cross-wise or crossways across the concave pan portion 65, which is extendible along the upper surface thereof, residue flowing along such upper surface can be briefly stalled or impeded when it encounters such interruption plate 81. Such flow interruption permits the residue to be chopped into shorter pieces, resulting in a lower mean length of chop (LOC) as the integral chopper assembly 46 operates. "Remote", "remotely" and other grammatical variations thereof refer to the operation and/or positioning of the interruption plate 81 from some distance from the insertion point, including, but not limited to, operating a handle positioned in a location accessible from the exterior of an agricultural vehicle, and wherein the positioning may be accomplished without the assistance of tools.

As shown in FIGS. 2, 3 and 4, remotely positionable interruption plate assembly 80 includes an interruption plate 81, which may take the form of a bar or plate slidably mounted on base 82 or other suitable structure. The interruption plate 81 is insertable and/or positionable in that the interruption plate 81 is moveable upwardly (i.e., in a direction substantially perpendicular to residue flow) into the passageway 70 (FIG. 3) between the rotary element 47 and concave pan portion 65. One suitable location for installation of the remotely positionable interruption plate 81 may be downstream of the slots 68, with respect to the flow of residue through the system, as shown in FIG. 4. The amount of insertion (i.e., the position) of the interruption plate 81 is such that the desired length of cut (LOC) is obtained. While the specific amount of displacement and distance of insertion of the interruption plate is not considered to be critical to the design of the interruption plate, it has been found desirable, with currently available chopping systems, to utilize interruption plates whose insertion distance falls within a range from about 1 mm to 25 mm. If desired, multiple interruption plates 81 can be employed.

As shown in FIGS. 2-4, the crop residue treatment and distribution system 24 includes a remotely positionable interruption plate assembly 80 having an interruption plate 81 that can be inserted through predetermined slots 88 in the concave pan portion 65. The interruption plate 81 is slidably fastened to base 82, which may include concave pan portion 65 or an independent sub-structure thereof. By "slidably fastened" it is meant that the interruption plate 81 is secured to the base 82 in a manner that permits at least linear motion along a plane. In particular, the motion permitted is such that the interruption plate 81 may be inserted into the passageway 70 to interrupt flow of residue and improve the chopping action within the crop residue treatment and distribution system 24. For example, the interruption plate 81 may be slidably fastened by slip washers or other fasteners 94 (see e.g. FIGS. 6-9) in a manner that allows the interruption plate 81 to slide freely in a linear direction. In one embodiment, the fasteners 94 may include slip washers that ride along slots 98 in interruption plate 81 (see FIG. 9). While the above has been described as a linear motion for positioning the interruption plate 81, the disclosure is not so limited. The mounting and positioning of the interruption plate 81 may include a mechanism that permits the adjustment of the angle to which the interruption plate 81 is inserted into the pathway 70, as desired by the operator to adjust the LOC and/or quality of residue chop.

As shown in FIGS. 2-5, an actuator member 83 or pivot arm is in communication with the interruption plate 81 and may be disposed forward or rearward of the interruption plate 81. The actuator member 83 may be supported by the base 82. For example the actuator member 83 may be rotatably secured to a sub-structure or the concave pan portion 65. The actuator member 83 has a geometry that is configured to permit the sliding actuation of the interruption plate 81.

Figure 6:
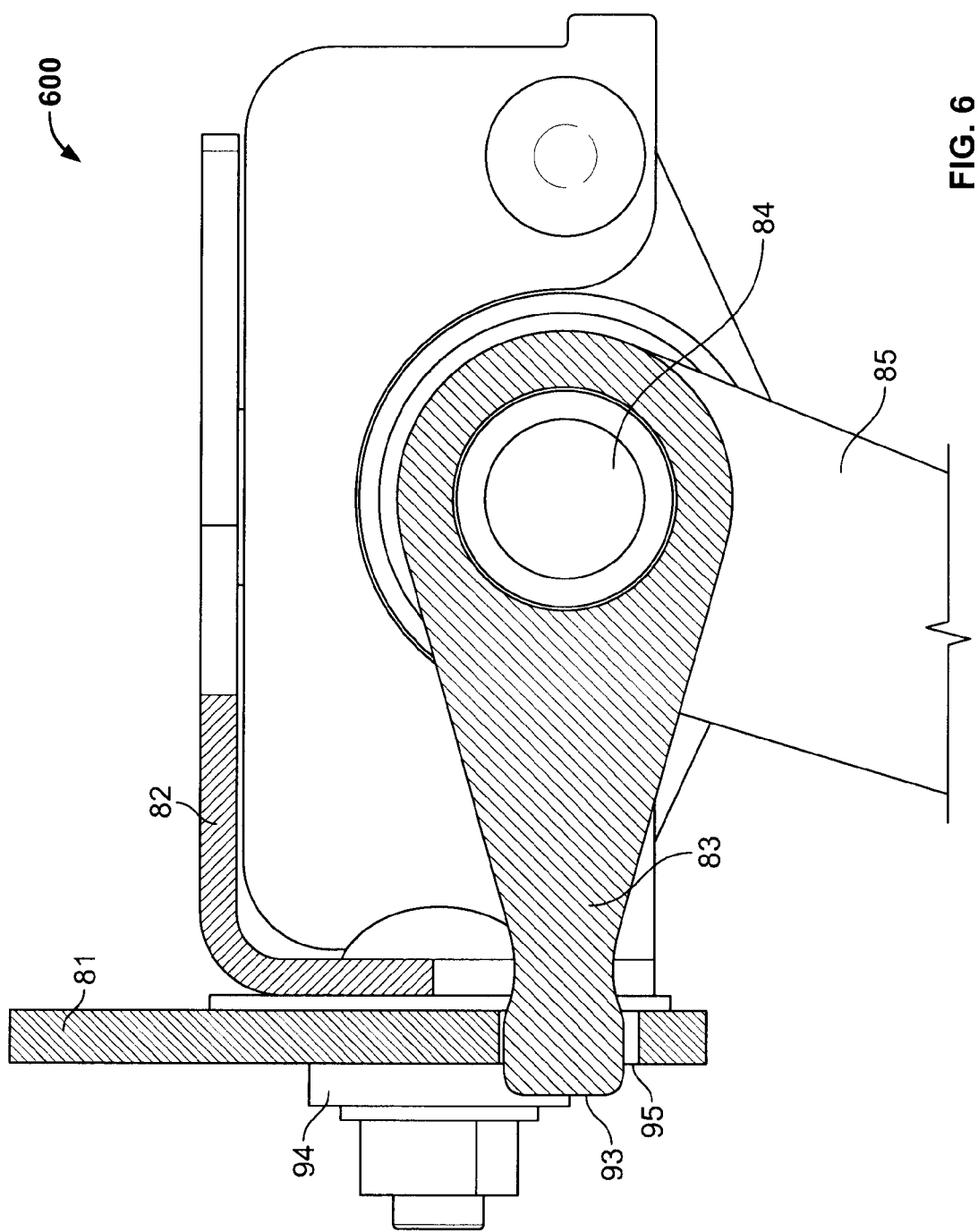
FIG. 6 is an enlarged side view of a portion of the interruption plate assembly of FIG. 5 better illustrating connection features between certain elements thereof.
Figure 8:
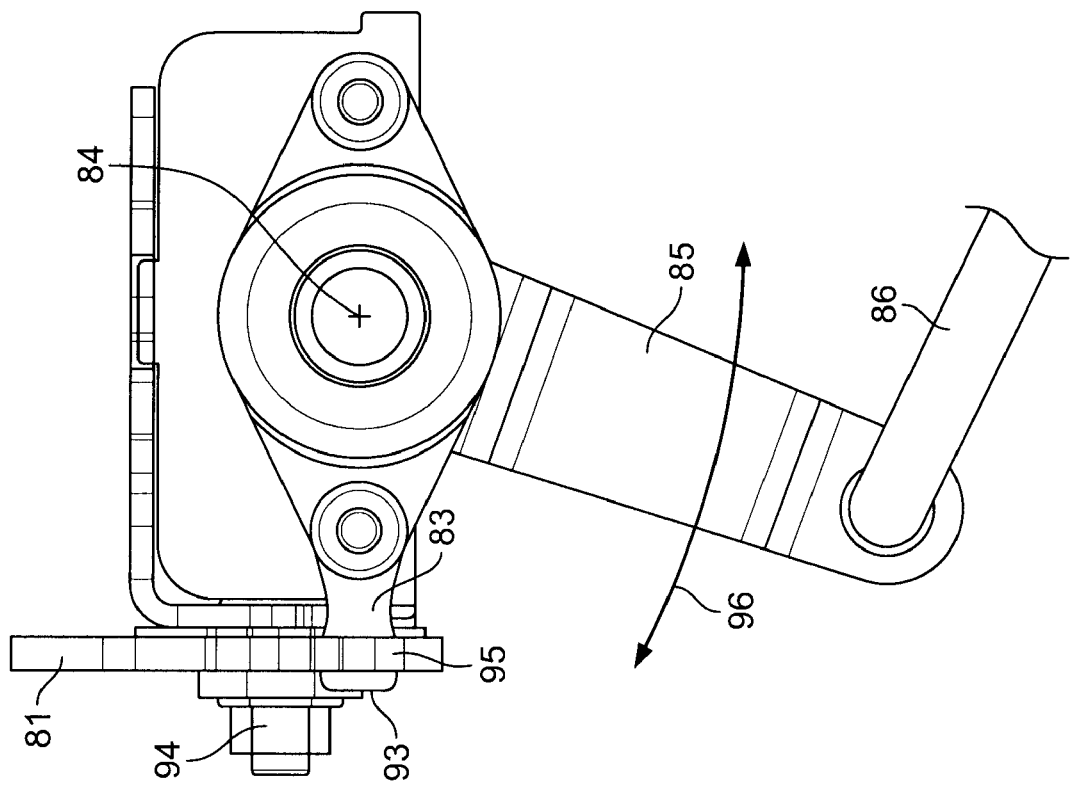
FIG. 7 and FIG. 8 show operation of the interruption plate assembly when positioning the interruption plate of FIG. 6.
Figure 7:
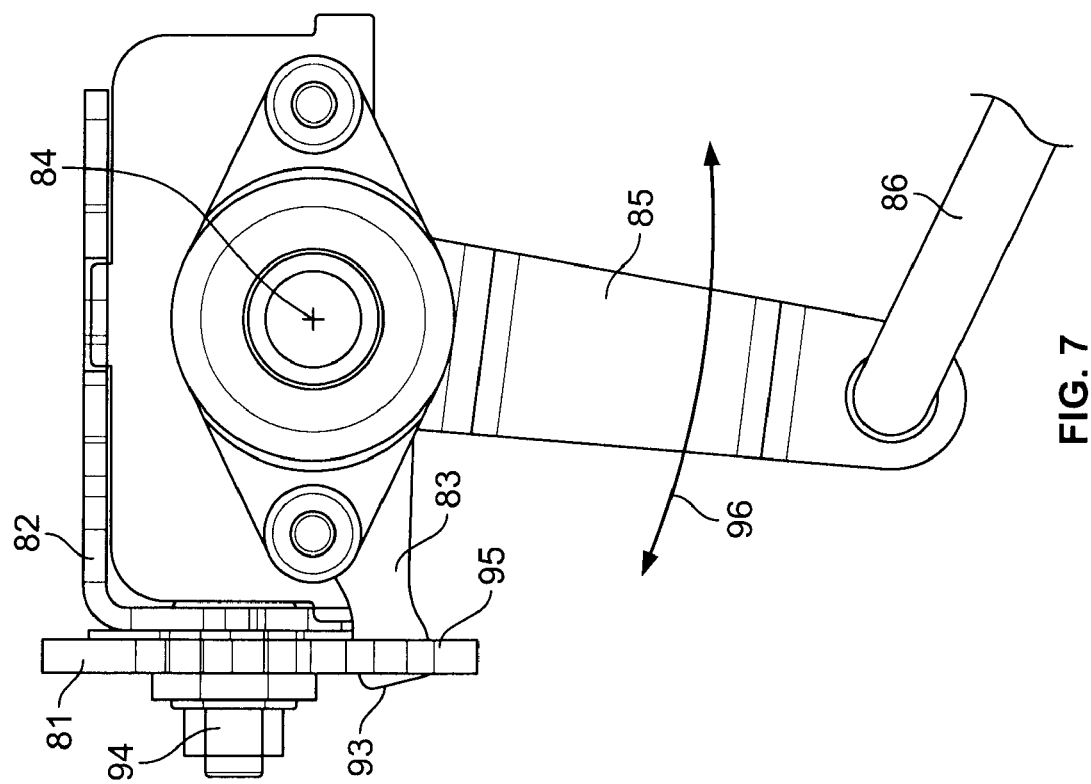

FIG. 6 shows an enlarged area 600 from FIG. 3, where the actuator member 83 includes a head portion 93 that is insertable into slot 95 of the interruption plate 81. As shown in FIGS. 7 and 8, the rotating or pivoting motion of the actuator member 83 urges the head portion 93 against one or more surfaces of the slot 95 of the interruption plate 81 to urge the interruption plate 81 in a linear direction. As visible in FIGS. 6-8, the actuator member 83 and head portion 93 profile is curved in such a way that the surface of the actuator member 83 maintains a tangency contact with a slot 95 in the interruption plate 81 when the actuator member 83 is pivoted to insert or retract the interruption plate 81. Alternatively, the surface of slot 95 may be configured so that at least portions of the profile of head portion 93 may not have a curved geometry. That is, the disclosure is not limited to the arrangement shown in FIG. 6, and several methods may then be used to cause the pivot arm to rotate and engage and disengage the interruption plate.

As shown in FIGS. 2-5, a handle 87, actuation shaft 86 and linkage arm 85 may be utilized to control the position of interruption plate 81. As best visible in FIG. 5, handle 87 has a retention plate 89 having predetermined slots 91 that receive the handle 87 and locks the handle 87 into position to set the desired position and engagement of the interruption plate 81. Moving the handle 87 will position the interruption plate 81 through pivoting and/or rotation of actuation shaft 85, linkage arm 85 and actuator member 83. In an alternate embodiment, the handle 87 may be set such that the retention of the handle 87 is affected by a manual over-center motion. When the link rod moves above the pivot axis of the handle, it will move "over-center" and lock into position. A tab on the handle may be used to hold it in position.

In still another alternate embodiment, an actuation shaft 86 may be rotated to rotate the actuator member 83 from the operator's station using a manual or automatic linkage. For example, additional mechanical linkages might be provided to provide the rotation. In the alternative, an automatic linkage, such as an electrical or hydraulic motor may provide rotation of actuation shaft 86 and/or the actuator member 83. The various linkages and members of the interruption plate assembly 80 may be fixed together and/or mounted using any suitable structure and/or methods including a rod end connector 101 (see FIG. 9) to the actuator member 83 by means of a pin or bolt.

Figure 9:
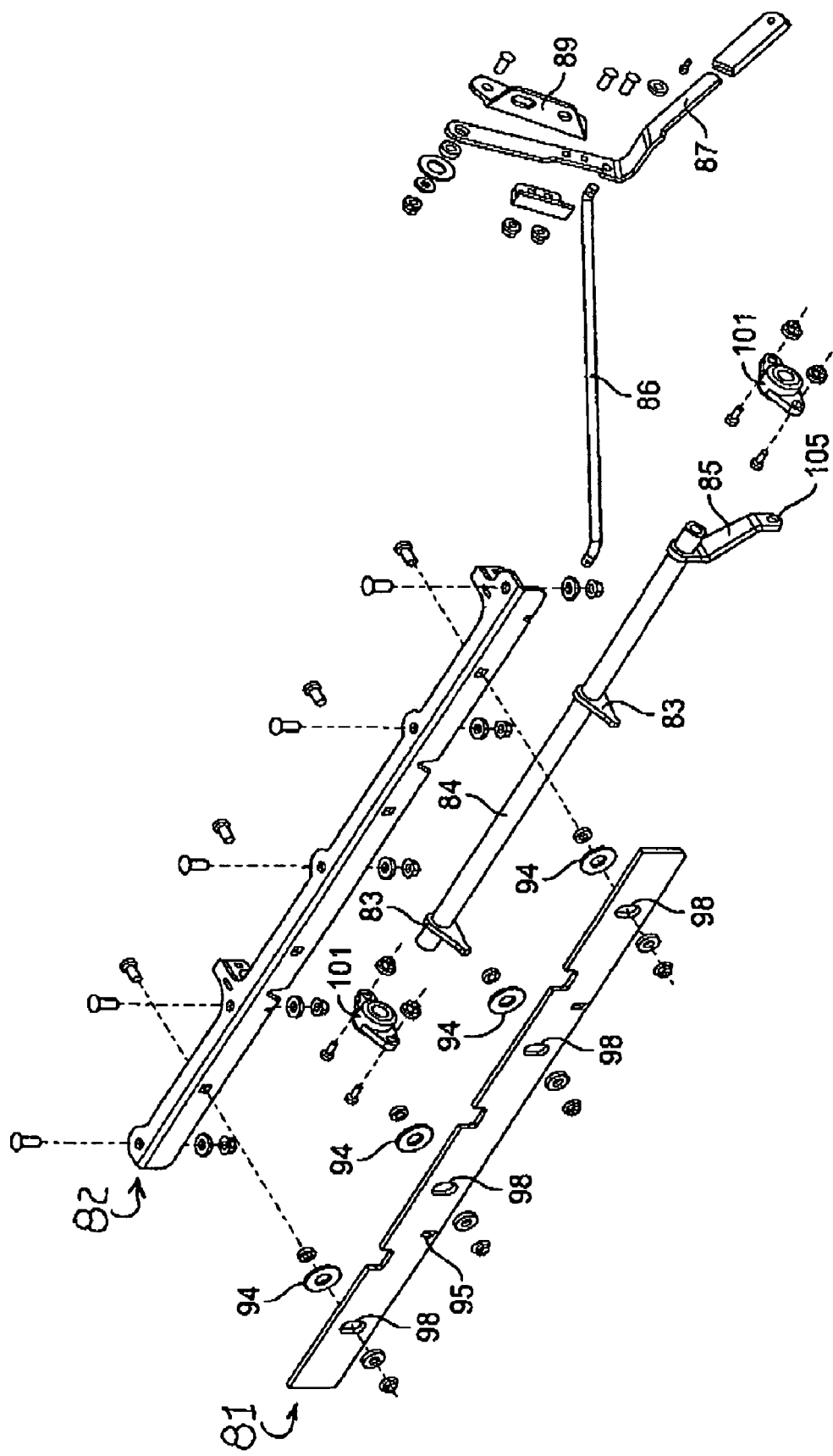
FIG. 9 is an exploded view of the interruption plate assembly.

FIG. 9 shows an exploded view of an interruption plate assembly 80 including a base 82, an interruption plate 81. The interruption plate assembly further includes a shaft 84 about which actuator members 83 rotate, and a linkage arm 85 that provides rotation to shaft 84. The shaft is rotatably mounted on a rod end connector 101 and the actuator members 83 engage slots 95. The interruption plate assembly 80 further includes a actuation shaft 86, which is fastenable to an end 105 of the linkage arm 85. The actuation shaft is attachable to handle 87, which is mounted with retention block 89. The base 82 and the various components may be mounted to the agricultural vehicle or other device in any suitable manner known in the art.

Figure 10:
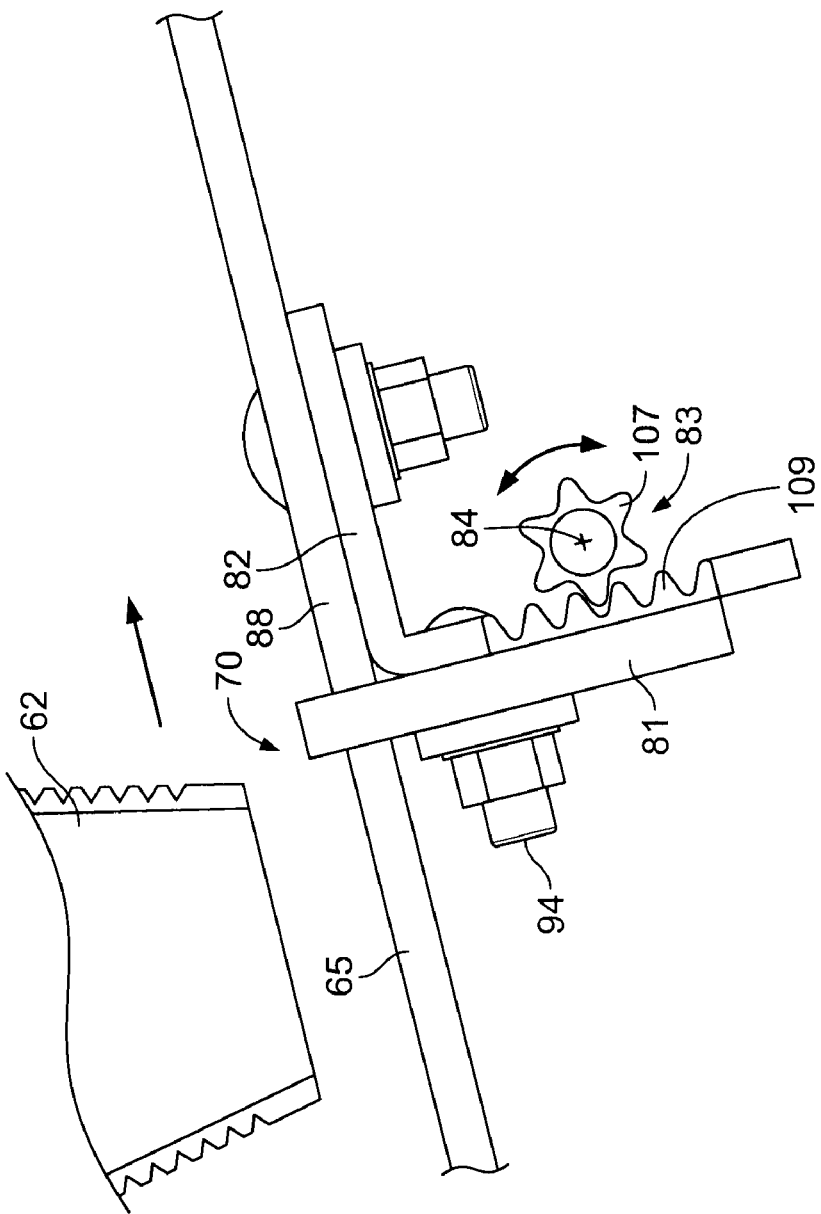
FIG. 10 is an enlarged, partial side view of an alternate embodiment of the interruption plate assembly.

FIG. 10 shows an alternate arrangement of actuator member 83, wherein the actuator member 83 is a rack and pinion arrangement that drives the slidably mounted interruption plate 81 along a linear direction. The interruption plate 81 is slidably mounted to a base 82 by fastener 94 or by another suitable fastening mechanism. In the arrangement shown a pinion 107 is mounted on shaft 84 and a rack 109 is fixedly mounted on the interruption plate 81. As shaft 84 rotates, through actuation of the handle or through other suitable actuation method, the pinion 107 urges the rack 109 and thereby the interruption plate 81 along a linear path, which results in insertion and/or withdrawal from the pathway 70. Although not shown, the mechanism for providing rotation to shaft 84 may include the linkage and handle system shown, for example, in FIG. 5.

Although the foregoing discussions have been presented with particular reference to integral chopper assemblies, it should be understood and appreciated that the present invention is not intended to be and should not be considered to be limited to use or practice in or with integral chopper systems. It should be recognized that the present invention may well also find application and be advantageously employed and practiced in various other types of chopper systems, including, by way of example only and not of limitation, hood mount chopper systems or towed chopper systems. Accordingly references in the claims which follow to chopper assemblies or chopper systems are intended to be broadly treated and not limited to integral chopper assemblies or systems.

In light of all the foregoing, it should thus be apparent to those skilled in the art that there has been shown and described an improved integral chopper assembly that includes various features and components, including a concave pan portion that includes a remotely insertable and/or positionable interruption plate downstream from the slots in the grate portion, that function to provide the advantages sought therefore. However, it should also be apparent that, within the principles and scope of the invention, many changes are possible and contemplated, including in the details, materials, and arrangements of parts which have been described and illustrated to explain the nature of the invention.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A remotely positionable interruption plate system for altering chop quality of residue in a chopper assembly comprising:
    a base;
    an interruption plate slidably mounted to the base, the interruption plate being arranged and disposed to selectively position the interruption plate into at least a portion of a residue flow of the chopper assembly; and
    an actuation member having a head portion receivable in a slot of the interrupting plate, wherein a profile of the activation member and the head portion are curved in such a way as to maintain a tangency contact with at least one surface of the slot so that as the actuation member is pivoted, the actuation member urges the interruption plate in a linear direction.

2. The interruption plate system of claim 1, further comprising an actuation member in communication with the interruption plate, the actuation member being arranged and disposed to position the interruption plate.

3. The interruption plate system of claim 2, further comprising an actuation shaft in communication with the actuation member and being manually rotatable by a handle mechanism.

4. The interruption plate system of claim 3, wherein the handle mechanism is lockable in a plurality of predetermined positions corresponding to predetermined positions of the interruption plate.

5. The interruption plate system of claim 2, further comprising an actuation shaft in communication with the actuation member.

6. The interruption plate system of claim 1, wherein the interruption plate is positionable at a height sufficient to momentarily stall or impede at least a portion of the residue flow to facilitate the chopping thereof by the chopper assembly.

7. The interruption plate system of claim 1, wherein the interruption plate is positionable in a plurality of positions that momentarily stall or impede at least a portion of the residue flow to facilitate the chopping thereof by the chopper assembly.

8. The interruption plate system of claim 1, wherein the interruption plate is positionable without the assistance of tools.

9. The interruption plate system of claim 1, wherein the interruption plate is positionable to provide insertion of from about 1 mm to about 25 mm into the residue flow.

10. An agricultural vehicle comprising:
    a chopper assembly having:
    a remotely positionable interruption plate system for altering chop quality in a chopper assembly having a base and an interruption plate slidably mounted to the base, the interruption plate being arranged and disposed to selectively position the interruption plate into at least a portion of a residue flow of the chopper assembly, wherein the interruption plate has a rack along one side thereof; and
    an actuation pinion member wherein as the actuation pinion member is rotated, the pinion member engages the rack, urging the interruption plate along a linear path for either inserting the interruption plate into at least a portion of a residue flow or retracting the interruption plate from at least a portion of a residue flow.

11. The agricultural vehicle of claim 10, wherein the agricultural vehicle is a combine having an integral chopper.

12. The agricultural vehicle of claim 11 further comprising an integral chopper including a concave pan portion having a generally concave upper surface along which residue flows as the residue passes through the chopper assembly, the concave pan portion having at least one opening;
    the interruption plate comprising a bar-like member insertable through said at least one opening and being positionable at predetermined heights above the concave pan portion to interrupt the residue flow along the flow surface of the concave pan portion;
    said interruption plate extending generally perpendicular to a flow surface of the residue along the concave pan portion; and
    said interruption plate being positionable at a height sufficient to momentarily stall or impede at least a portion of the flow of residue pieces to facilitate the chopping thereof by the chopper assembly.

13. The agricultural vehicle of claim 10, further comprising an actuation member in communication with the interruption plate, the actuation member being arranged and disposed to position the interruption plate.

14. The agricultural vehicle of claim 13, further comprising an actuation shaft in communication with the actuation member and being manually rotatable by a handle mechanism.

15. The agricultural vehicle of claim 14, wherein the handle mechanism is accessible from exterior of the agricultural vehicle.

16. The agricultural vehicle of claim 10, wherein the interruption plate is positionable without the assistance of tools.

17. The agricultural vehicle of claim 10, wherein the interruption plate is positionable to provide insertion of from about 1 mm to about 25 mm into the residue flow.

18. A method of chopping residue formed during harvesting, the method comprising:
    providing a chopper assembly including a remotely positionable interruption plate system, the interruption plate system including:
    a base;
    an interruption plate slidably mounted to the base, the interruption plate being arranged and disposed to selectively position the interruption plate into at least a portion of a residue flow of the chopper assembly,
    providing an actuation member, wherein when the actuation member is pivoted, the actuation member urges the interruption plate in a substantially vertical direction;
    chopping the residue; and
    modifying the length of cut of the residue by pivoting the actuation member to either insert the interruption plate into at least a portion of a residue flow or retract the interruption plate from a portion of a residue flow.

* * * * *